United States Patent
Trillo Vargas et al.

(10) Patent No.: US 11,119,734 B2
(45) Date of Patent: Sep. 14, 2021

(54) SOFTWARE DETECTION AND MODIFICATION

(71) Applicant: INTERNATIONAL BUSINESS MACHINES CORPORATION, Armonk, NY (US)

(72) Inventors: Jesus Gabriel Trillo Vargas, Guadalajara (MX); Arturo Adrian Reynoso Ibarra, Guadalajara (MX); David Rodriguez Torres, Guadalajara (MX); Oscar Martinez Huezo, Guadalajara (MX)

(73) Assignee: International Business Machines Corporation, Armonk, NY (US)

( * ) Notice: Subject to any disclaimer, the term of this patent is extended or adjusted under 35 U.S.C. 154(b) by 131 days.

(21) Appl. No.: 16/675,528

(22) Filed: Nov. 6, 2019

(65) Prior Publication Data

US 2021/0132912 A1 May 6, 2021

(51) Int. Cl.
*G06F 8/30* (2018.01)
*G06N 3/10* (2006.01)
(Continued)

(52) U.S. Cl.
CPC ............... *G06F 8/30* (2013.01); *G06F 16/27* (2019.01); *G06N 3/08* (2013.01); *G06N 3/10* (2013.01)

(58) Field of Classification Search
None
See application file for complete search history.

(56) References Cited

U.S. PATENT DOCUMENTS 10,997,551 B2 * 5/2021 Kikinis .............. G06Q 20/3672
2016/0027229 A1 1/2016 Spanos
(Continued)

FOREIGN PATENT DOCUMENTS

CN 108717626 A 10/2018
CN 108846942 A 11/2018
(Continued)

OTHER PUBLICATIONS

O. Leiba, Y. Yitzchak, R. Bitton, A. Nadler and A. Shabtai, "Incentivized Delivery Network of IoT Software Updates Based on Trustless Proof-of-Distribution," 2018 IEEE European Symposium on Security and Privacy Workshops (EuroS&PW), 2018, pp. 29-39, doi: 10.1109/EuroSPW.2018.00011. (Year: 2019).*

*Primary Examiner* — Andrew M. Lyons
(74) *Attorney, Agent, or Firm* — Schmeiser, Olsen & Watts; Aaron Pontikos

(57) ABSTRACT

A method and system for detecting software is provided. The method includes executing determination software for detecting a decision associated with an individual of a plurality of individuals. A selection for a specified user type associated with the individual is received and a push notification is transmitted. In response, specified software loaded within active devices is activated and the active device is registered with a valid hardware node within a blockchain instance. The valid node is associated with a group of digital tokens and an associated group of blockchain addresses and modified digital tokens are transmitted to the valid node. A weighting value is assigned to the modified digital token and the modified digital token is analyzed with respect to an associated weighting value. In response, the determination software is modified.

20 Claims, 7 Drawing Sheets

(51) Int. Cl.
    *G06F 16/27*           (2019.01)
    *G06N 3/08*            (2006.01)

(56) References Cited

U.S. PATENT DOCUMENTS

| | | | |
|---|---|---|---|
| 2017/0046689 A1* | 2/2017 | Lohe | G06Q 20/40 |
| 2017/0330174 A1* | 11/2017 | Demarinis | G06F 21/62 |
| 2018/0114392 A1 | 4/2018 | Mejia | |
| 2018/0176229 A1* | 6/2018 | Bathen | H04W 12/106 |
| 2018/0227116 A1* | 8/2018 | Chapman | H04L 9/3239 |
| 2019/0065610 A1* | 2/2019 | Singh | H04L 51/32 |
| 2019/0068380 A1 | 2/2019 | Tang | |
| 2019/0139032 A1* | 5/2019 | Heavey | G06Q 20/065 |
| 2019/0215149 A1* | 7/2019 | Ramasamy | H04L 67/1012 |
| 2019/0305959 A1* | 10/2019 | Reddy | G06F 8/60 |
| 2019/0325532 A1* | 10/2019 | Torrenegra | G06Q 10/1053 |
| 2020/0044857 A1* | 2/2020 | Snow | H04L 9/0643 |
| 2020/0074778 A1* | 3/2020 | Shapira | H04L 9/3213 |
| 2020/0250176 A1* | 8/2020 | Padmanabhan | G06F 8/61 |

FOREIGN PATENT DOCUMENTS

| | | | | |
|---|---|---|---|---|
| WO | WO-2019108436 A1 * | 6/2019 | | G06F 16/1834 |
| WO | WO-2020061093 A1 * | 3/2020 | | G06Q 20/3823 |
| WO | WO-2020130717 A1 * | 6/2020 | | G06Q 50/34 |

\* cited by examiner

SOFTWARE DETECTION AND MODIFICATION

BACKGROUND

The present invention relates generally to a method for detecting software and in particular to a method and associated system for improving software technology associated with registering active devices with hardware nodes and associate valid nodes with a group of digital tokens for detecting a decision and modifying associated software.

SUMMARY

A first aspect of the invention provides a software detection method comprising: executing, by a processor of an electronic device enabling a blockchain instance, determination software for detecting a decision associated with an individual of a plurality of individuals; receiving, by the processor from a user, a selection for a specified user type associated with the individual; transmitting, by the processor to devices of the plurality of individuals, a push notification; activating, by the processor in response to a response to the transmitting, specified software loaded within active devices of the devices; registering, by the processor, an active device of the active devices with a valid hardware node within the blockchain instance; associating, by the processor, the valid hardware node with a group of digital tokens and an associated group of blockchain addresses; transmitting, by the processor to the valid node via the associated group of blockchain addresses, modified digital tokens of the group of digital tokens, wherein the modified digital tokens comprise embedded digital data associated with the decision; assigning, by the processor, a weighting value to a modified digital token of the modified digital tokens; analyzing, by the processor executing neural network software, the modified digital token with respect to an associated weighting value; and modifying, by the processor based on results of the analyzing, the determination software.

A second aspect of the invention provides a computer program product, comprising a computer readable hardware storage device storing a computer readable program code, the computer readable program code comprising an algorithm that when executed by a processor of an electronic device implements a software detection method, the method comprising: executing, by the processor enabling a blockchain instance, determination software for detecting a decision associated with an individual of a plurality of individuals; receiving, by the processor from a user, a selection for a specified user type associated with the individual; transmitting, by the processor to devices of the plurality of individuals, a push notification; activating, by the processor in response to a response to the transmitting, specified software loaded within active devices of the devices; registering, by the processor, an active device of the active devices with a valid hardware node within the blockchain instance; associating, by the processor, the valid hardware node with a group of digital tokens and an associated group of blockchain addresses; transmitting, by the processor to the valid node via the associated group of blockchain addresses, modified digital tokens of the group of digital tokens, wherein the modified digital tokens comprise embedded digital data associated with the decision; assigning, by the processor, a weighting value to a modified digital token of the modified digital tokens; analyzing, by the processor executing neural network software, the modified digital token with respect to an associated weighting value; and modifying, by the processor based on results of the analyzing, the determination software.

A third aspect of the invention provides an electronic device comprising a processor coupled to a computer-readable memory unit, the memory unit comprising instructions that when executed by the processor implements a software detection method comprising: executing, by the processor enabling a blockchain instance, determination software for detecting a decision associated with an individual of a plurality of individuals; receiving, by the processor from a user, a selection for a specified user type associated with the individual; transmitting, by the processor to devices of the plurality of individuals, a push notification; activating, by the processor in response to a response to the transmitting, specified software loaded within active devices of the devices; registering, by the processor, an active device of the active devices with a valid hardware node within the blockchain instance; associating, by the processor, the valid hardware node with a group of digital tokens and an associated group of blockchain addresses; transmitting, by the processor to the valid node via the associated group of blockchain addresses, modified digital tokens of the group of digital tokens, wherein the modified digital tokens comprise embedded digital data associated with the decision; assigning, by the processor, a weighting value to a modified digital token of the modified digital tokens; analyzing, by the processor executing neural network software, the modified digital token with respect to an associated weighting value; and modifying, by the processor based on results of the analyzing, the determination software.

The present invention advantageously provides a simple method and associated system capable of accurately modifying software functionality.

DETAILED DESCRIPTION

Figure 1:
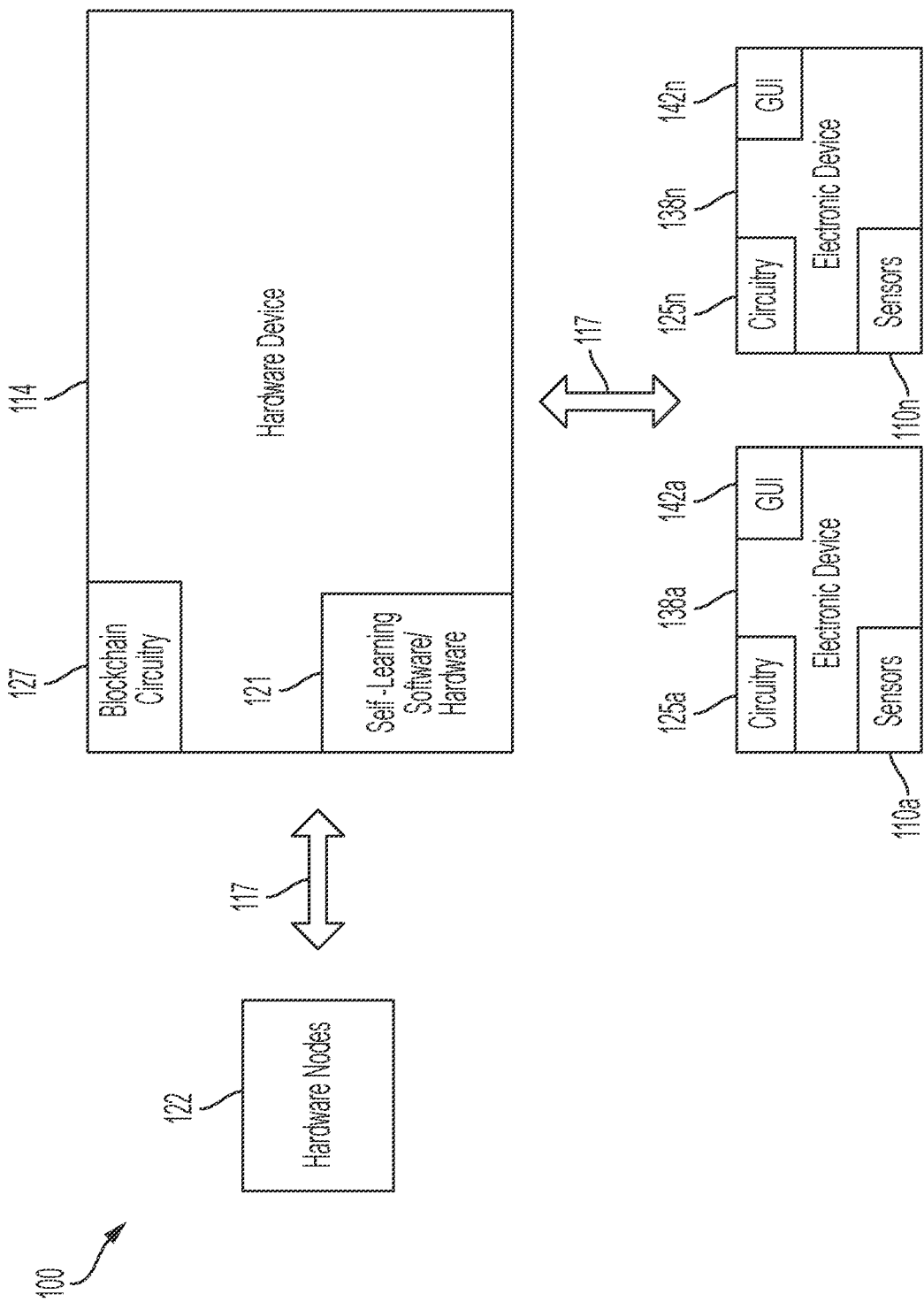
FIG. 1 illustrates a system for improving software technology associated with registering active electronic devices with hardware nodes and associating valid nodes with a group of digital tokens for detecting a decision and modifying associated software, in accordance with embodiments of the present invention.

FIG. 1 illustrates a system 100 for improving software technology associated with registering active electronic devices 138a . . . 138n with hardware nodes 122 and associating valid nodes with a group of digital tokens for detecting a decision and modifying associated software, in accordance with embodiments of the present invention. A standard decision determination-based system (e.g., a voting system) is typically associated with individuals involved with decision making functions occurring during voting timeframes. Therefore, interest from highly capable individuals is being lost as there is no direct way to participate in a planning process. Likewise, most geographical locations implement a process associated with enabling non-administrative individuals to be involved in a decision-making process during voting timeframes only thereby allowing individual expertise to be lost. Likewise, a standard decision-making process may be easily corrupted. Therefore, system 100 comprises an improved infrastructure deployment associated with blockchain decision making that provides for cost efficient transactions, easy auditability, and expertise incorporation into decision making processes with respect to an inability to tamper with the system.

System 100 comprises an improved system and process for enabling a voting process within a decentralized digital session (e.g., blockchain including a start date and an end date) configured for retrieving digital information from a predetermined repository comprising expert-based data related to a voting context (i.e., topic related experts) within public administrations as follows:

The process is initiated when digital weights are assigned to prospective voters in accordance with a determined value of respective expertise. Subsequently, a push notification (i.e., comprising the voting information from the predetermined repository) is transmitted to an associated electronic device (e.g., electronic devices 138a . . . 138n) associated with a specified voter. The push notification notifies the specified voter that he/she has been selected to vote. The specified voter and associated electronic device are configured as an active voting status in response to receiving acceptance of an invitation to vote. Likewise, a smart contract and digital wallet (yes/no/abstain) is generated for the specified voter to receive a digital voting token. Additionally, information (including the voting token, the start date and the end date of the voting session, and related information to understand a decision to make) is transmitted to an active voter. Subsequently, comments received are abstracted via execution of cognitive hardware/software to provide insights from digital wallets.

System 100 of FIG. 1 includes a hardware device 114 (i.e., a specialized hardware device), electronic devices 138a . . . 138n, and hardware nodes 122 interconnected through a network 117. Hardware device 114 includes specialized blockchain circuitry 127 (that may include specialized software) and self-learning software code/hardware structure 121 (i.e., including self-learning software code). Electronic devices 138a . . . 138n may include, inter alia, a smart phone, a tablet computer, a computer, etc. Electronic devices 138a . . . 138n may be Bluetooth enabled to provide connectivity to each other and any type of system. Electronic devices 138a . . . 138n include specialized circuitry 125a . . . 125n (that may include specialized software), sensors 110a . . . 110n, and a GUI 142a . . . 142n. Sensors 110a . . . 110n may include any type of internal or external sensor (or biometric sensor) including, inter alia, ultrasonic three-dimensional sensor modules, a heart rate monitor, a blood pressure monitor, a temperature sensor, a pulse rate monitor, an ultrasonic sensor, an optical sensor, a video retrieval device, an audio retrieval device, humidity sensors, voltage sensors, etc. Hardware device 114 and electronic devices 138a . . . 138n may each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, hardware device 114 and electronic devices 138a . . . 138n may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-7. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving software technology associated with registering active electronic devices with hardware nodes and associating valid nodes with a group of digital tokens for detecting a decision and modifying associated software. Network 117 may include any type of network including, inter alia, a local area network, (LAN), a wide area network (WAN), the Internet, a wireless network, etc. Alternatively, network 117 may include an application programming interface (API).

System 100 enables the following process for dynamically enabling an expert individual (e.g., technical expertise) or interested voter (a shareholder, party members, etc.) to access an application for generating a digital seed for a digital wallet address. The process is initiated when a main client system generates a new voting session comprising start and end dates. The main client system retrieves voting information from a corresponding table (within specialized memory) based on the main client's case. Subsequently, a use case algorithm is selected. The use case algorithm may be associated with the following cases: an expert case, a shareholder case, or a miscellaneous case. An expert case is defined herein as a case in which voters are given a preponderated weight in the voting session to value their expertise along the process. A shareholder case is defined herein as a case associated with a business selling ownership shares thereby enabling owners of the distributed shares to have a voice in the decision-making process with respect to possessing of a finite number of shares. A miscellaneous case is defined herein as a case where any other given voting session case is required and the vote does not require weighting.

Based on information stored within a corresponding database for each main client, all experts (or voters) receive (via specialized software of an electronic device) a push notification notifying them that they were selected for voting. Upon accepting the invitation (within the push notification), a corresponding answer is transmitted back to a system such that the associated expert individual is set as active and may be counted for the voting session. The expert individual is provided with start and end dates of the voting session and all relevant information for review. The aforementioned process enables the system to filter noise within a weighting process by eliminating voters not to be considered.

A subsequent smart digital contract is generated with respect to confirmed voters and digital wallets for storing a voting decision value of "Approve", "Reject", and "Abstain". Additionally, the smart digital contract comprises dates in which the digital tokens are valid. Confirmed digital wallet addresses included in the smart digital contract receive an associated digital token in combination with necessary information from the voting session such that they may review necessary information and implement an informed decision. Subsequently, voters will select a voting decision of "Approve", "Reject", or "Abstain" and will generate an independent comment with respect to a reason for the vote.

When a voting session is due for implementation, received digital tokens per digital wallet are weighted based on the following cases:

1. An expert case initiates execution of analytic hierarchical token calculation process (AHTCP) code based on stored expertise descriptions per voter. The executed AHTCP code will weight and value the received digital tokens and will decide (based on client input) how many valid votes (value >0 from the total # of voters), dummy votes, and stored experiences are to be weighted more than the others.
2. A stakeholder case enables received digital tokens to be weighted based on a percentage of ownership of a total of shares.
3. A miscellaneous case enables all votes to be weighted equally (i.e., 1:1).

After digital tokens are weighted, a cognitive service is executed to generate a digital abstract of the comments transmitted to the digital wallets (Approve, Reject, and Abstain) to provide insights from each digital wallet.

Figure 2:
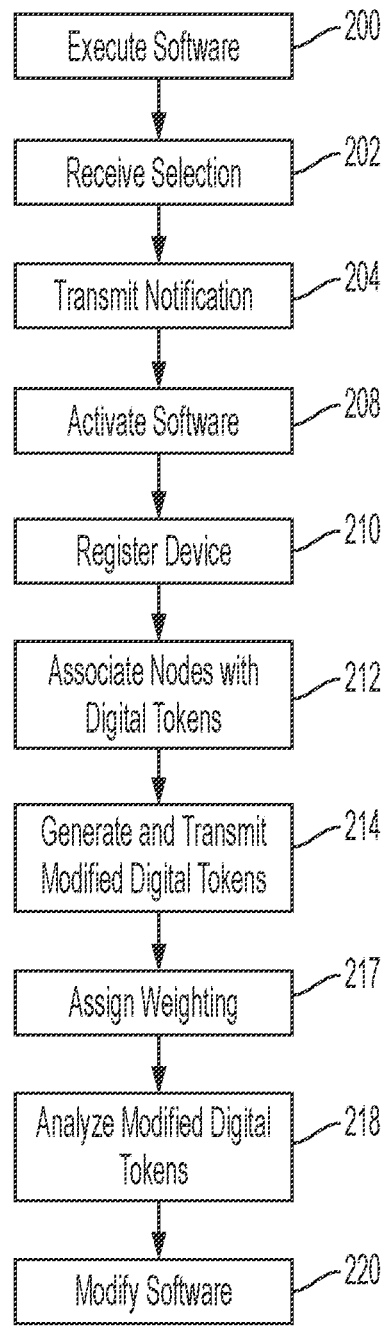
FIG. 2 illustrates an algorithm detailing a process flow enabled by the system of FIG. 1 for improving software technology associated with registering active electronic devices with hardware nodes and associating valid nodes with a group of digital tokens for detecting a decision and modifying associated software, in accordance with embodiments of the present invention.

FIG. 2 illustrates an algorithm detailing a process flow enabled by system 100 of FIG. 1 for improving software technology associated with registering active electronic devices with hardware nodes and associating valid nodes with a group of digital tokens for detecting a decision and modifying associated software, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by hardware device 114 and electronic devices 138a . . . 138n of FIG. 1. In step 200, determination software is executed by an electronic device enabling a blockchain instance. The determination software is for detecting a decision associated with individuals of a plurality of individuals. In step 202, a selection for a specified user type associated with an individual is received from a user. The specified user type may include, inter alia, an expertise type, a shareholder type, a miscellaneous type, etc. In step 204, a push notification is transmitted to the individuals. In step 208, specified software loaded within active devices is activated based on the transmission of step 204. In step 210, active devices are registered with a valid hardware node within the blockchain instance. In step 212, valid nodes are associated with a group of digital tokens and an associated group of blockchain addresses. In an embodiment, an associated group of blockchain addresses is associated with three destination node addresses of an associated group of blockchain addresses. In an embodiment, an associated group of blockchain addresses can be associated with any number of destination node addresses of an associated group of blockchain addresses. An associated selection may be received, randomly, in accordance with execution of sigma distribution software for randomly selecting a specified number of nodes per a normal weight distribution, etc.

In step 214, modified digital tokens are generated (from the group of digital tokens) and transmitted to valid nodes via each associated group of blockchain addresses. The modified digital tokens comprise embedded digital data associated with each decision.

In step 217, a weighting value is assigned to modified digital tokens. Assigning the weighting value may include: adjusting initial weighting values in accordance with an expertise type. Alternatively, assigning the weighting value may include: adjusting initial weighting values in accordance with a proportion of shares owned by each of the individuals vs a total of existing shares. Additionally (i.e., per a designated number of nodes selected in step 212), a weight of the digital tokens is assessed or ignored depending on a client selection, such as, randomly from a full population, randomly per normal distribution, all votes are considered, etc.

In step 218, modified digital tokens are analyzed with respect to an associated weighting value. Analyzing modified digital tokens may include; detecting similarities between input data with respect to digital parameters associated with comment analysis; and aggregating the similarities with respect to a topic and a domain for a total number of comments received with respect to each associated group of blockchain addresses. In step 220, determination software is modified based on results of the analysis of step 218.

Figure 3:
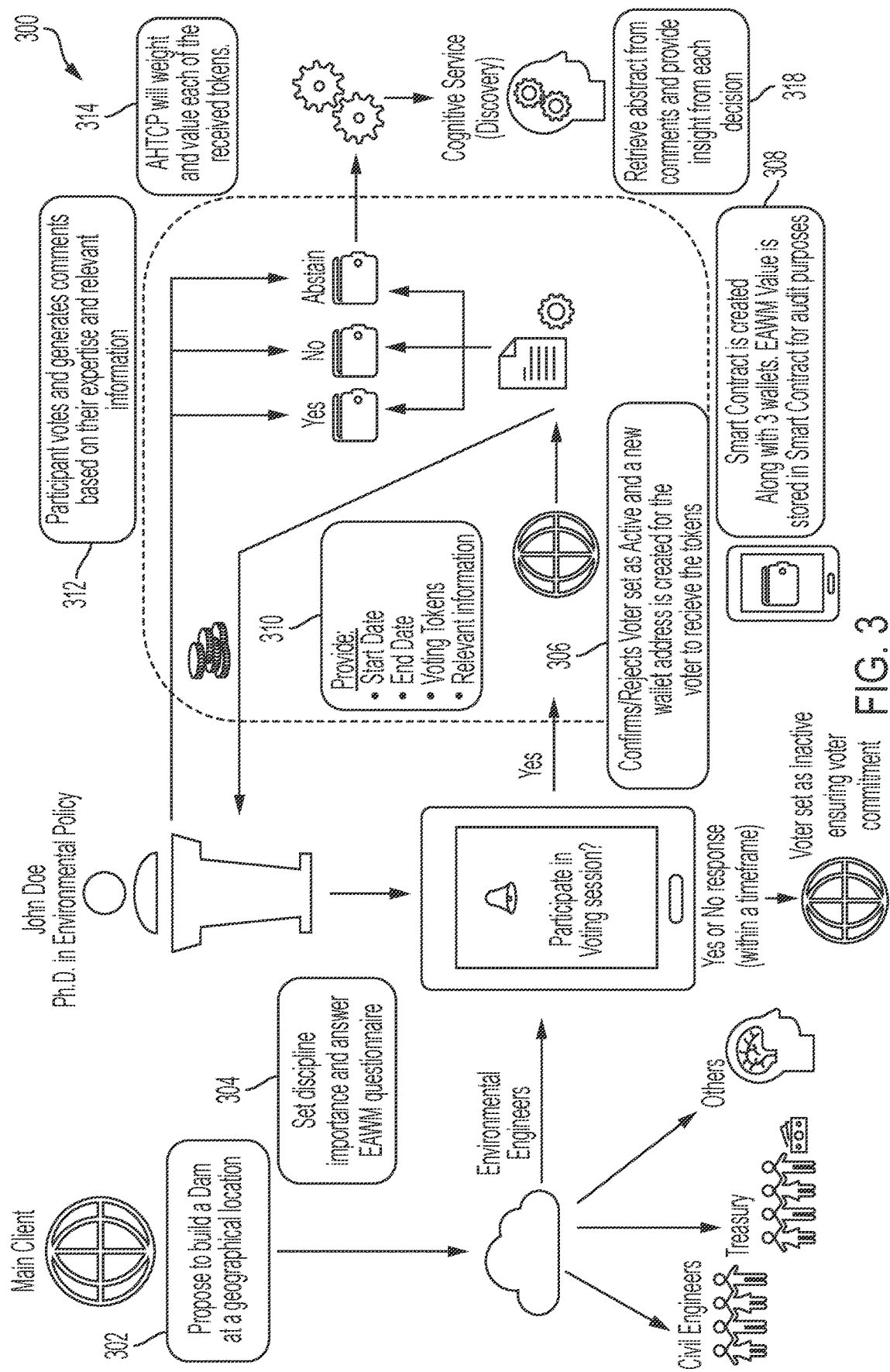
FIG. 3 illustrates an implementation example enabling a system for implementing an algorithm for detecting a decision and associated information, in accordance with embodiments of the present invention.

FIG. 3 illustrates the following implementation example enabling a system 300 implementing an algorithm for detecting a decision and associated information, in accordance with embodiments of the present invention. The process is initiated in step 302 when a main user (e.g., an entity such as an enterprise or organization) requests a decision that requires multiple individuals to provide a decision and associated thoughts (e.g., a proposal to build a dam in a specified location).

In step 304, the main user selects a corresponding case such as an expert, a shareholder or a miscellaneous individual. If the main user selects an expert case, then received votes are weighted with respect to execution of AHTCP logic (code). Resulting AHTCP values are adjusted such that an expertise assessment weight matrix (EAWM) reflects a weight per expertise required. A population selection process (for selecting a corresponding case) may include a random selection process. Alternatively, population selection process may include a sigma distribution process for randomly selecting a specified number of hardware nodes per normal weight distribution (e.g., a Gaussian distribution). If the main user selects a shareholder case, then vote weighting factors are equal to a proportion of shares owned vs a total number of existing shares. If the main user selects a miscellaneous case, then weighting factors are applied to the votes equally.

In step 306, the main user's device (e.g., a server, a portable computing device, etc.) transmits a push notification to all registered voters and voters (devices) that accept a voting session are set as active voters. With respect to an expert case, voters (i.e., experts) may comprise members of different organizations that certify expertise (IEEE, PMI, Law School, etc.). Likewise, a registered owner of stocks or any stake/asset representation is considered to be a shareholder voter type.

In step 310, a digital smart contract is generated with respect to all active voter devices being registered as valid hardware nodes within a blockchain transaction instance in combination with a total number of digital tokens and three destination node addresses (i.e., approve, reject, and abstain options). Alternatively, a digital contract is generated with respect to all active voter devices being registered as valid hardware nodes within a blockchain transaction instance in combination with a total number of digital tokens and any number of destination node addresses. Subsequently, an EAWM value is stored within the digital smart contract to present a weighting criteria for logic auditing processes. A weighting factor per an active voter's stake is stored within the smart digital contract.

Additionally in step 310, the smart digital contract transmits one or more of the following information to voters: a digital token, a start date, and end date, and voting session information such as additional documentation.

In step 312, voters transmit their decision (i.e., via an application presenting the three options with a space to submit comments) to a corresponding hardware node address. The decision and associated comments are transmitted as a digital token transaction with an embedded opinion. If a voter does not select any option within an end date time frame, system 300 will transmit the digital token to an abstain hardware node address in combination with a message stating that the voter did not select any option thereby reducing any external within future analysis steps.

In step 314, a total number of decision digital tokens are weighted and selected in accordance to the process of step 304.

In step 318, trained neural network code (i.e., recognizing similarities between a given input as parameters such as feeling, sentiment, etc.) adds the parameters as comment analysis. Additionally, similarities (between a topic and a domain for the total of comments received on each decision node address) are aggregated. Subsequently, the main user receives a weighted total (from step 314) and comment analysis from each decision node address.

Figure 4:
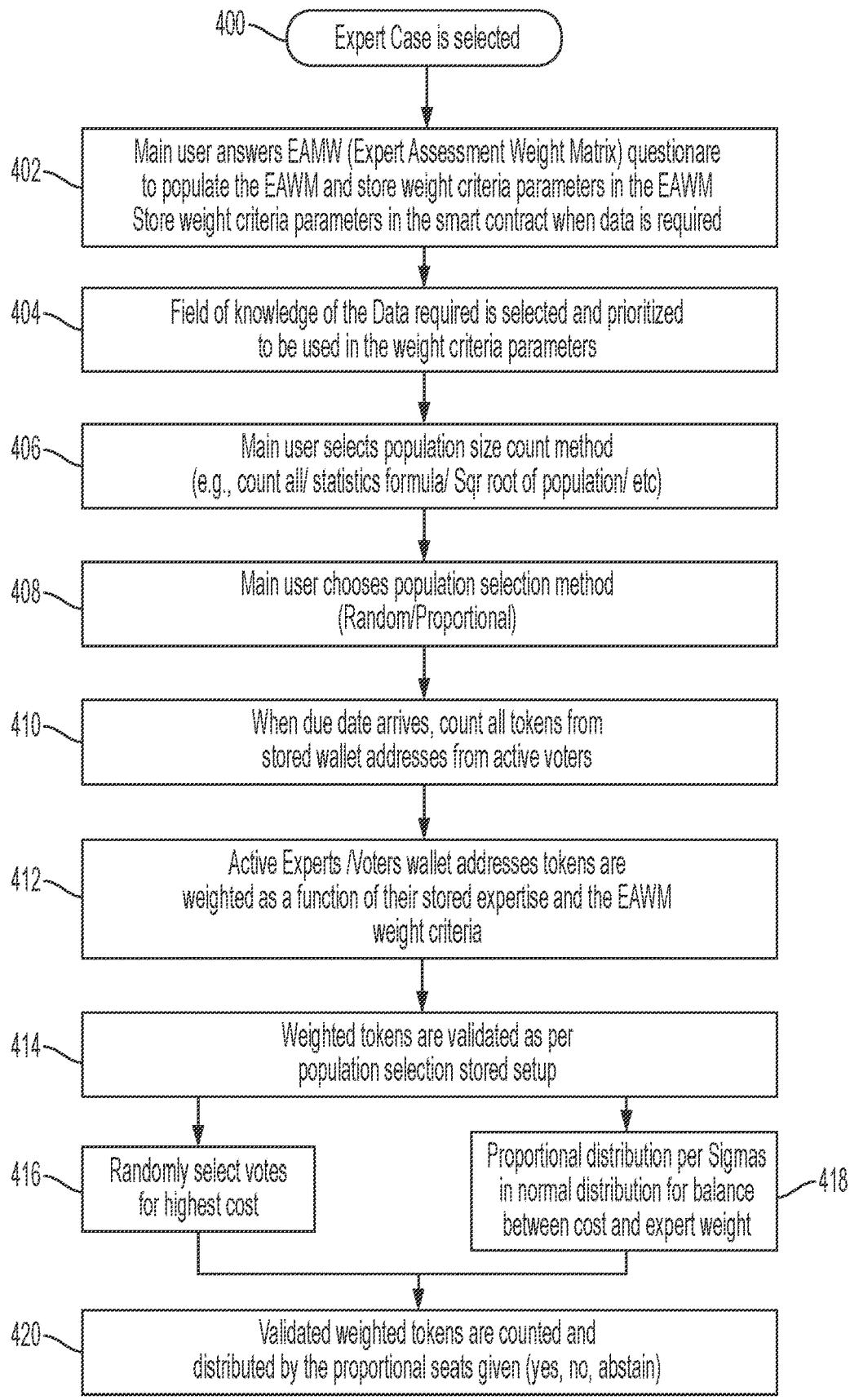
FIG. 4 illustrates execution of an AHTCP algorithm, in accordance with embodiments of the present invention.

FIG. 4 illustrates execution of an AHTCP algorithm, in accordance with embodiments of the present invention. In step 400, an expert case (for a voting process) is selected. In step 402, a main user responds to an expert assessment weighting matrix (EAWM) questionnaire for populating the EAWM questionnaire and storing the weighting criteria parameters within a digital smart contract when data is required. In step 404, required field of knowledge attributes are selected and prioritized for usage within weighting criteria parameters. In step 406, the main user selects a population size count method. A population size count method may include, count all, statistics formula, and square root of population processes.

In step 408, the main user selects a population selection method such as a random or proportion selection method. In step 410, digital tokens from stored digital wallet addresses are counted with respect to active voters. In step 412, wallet address tokens (retrieved from active expert voters) are weighted as a function of stored expertise and EAWM weighing criteria. In step 414, weighted digital tokens are validated as per a population stored setup. In step 416, highest cost votes are randomly selected. In step 418, weighted digital tokens are proportionally distributed. In step 420, validated weighted digital tokens are counted and distributed with respect to votes.

Figure 5:
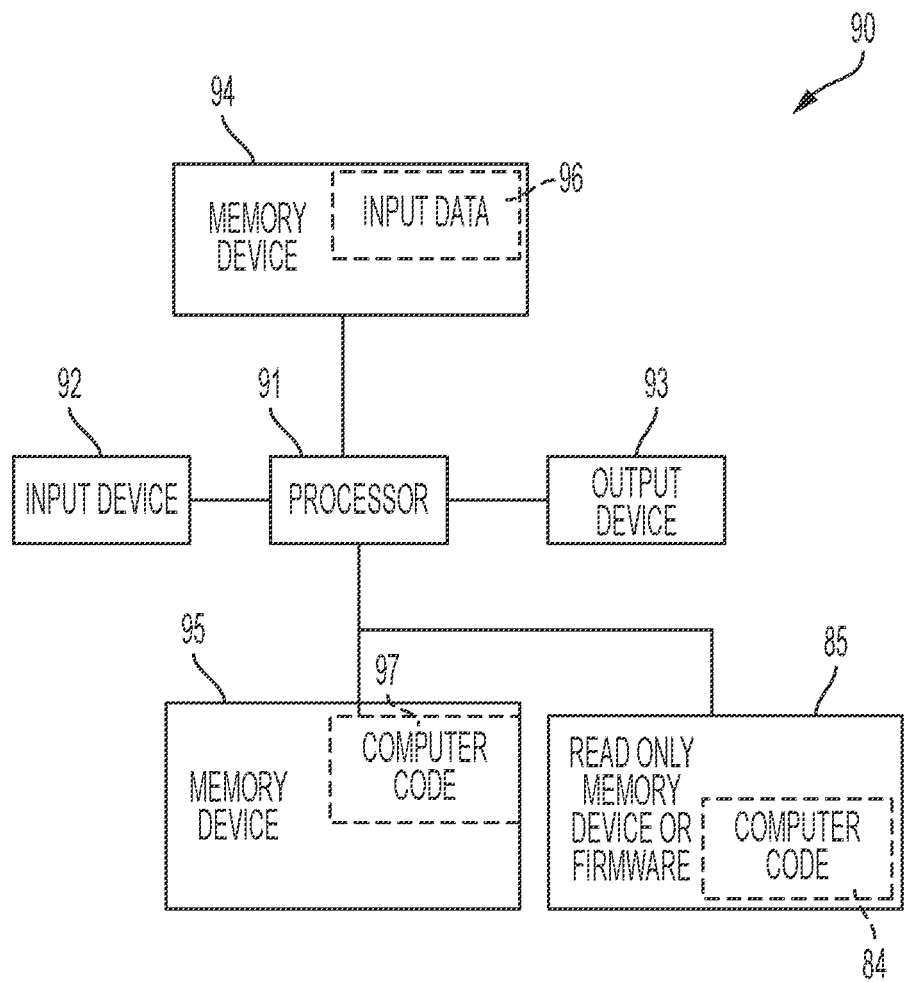
FIG. 5 illustrates a computer system used by the system of FIG. 1 for improving software technology associated with registering active electronic devices with hardware nodes and associating valid nodes with a group of digital tokens for detecting a decision and modifying associated software, in accordance with embodiments of the present invention.

FIG. 5 illustrates a computer system 90 (e.g., electronic devices 138a . . . 138n and/or hardware device 114 of FIG. 1) used by or comprised by the system of FIG. 1 for improving software technology associated with registering active electronic devices with hardware nodes and associating each valid node with a group of digital tokens for detecting a decision and modifying associated software, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithms of FIGS. 2 and 3) for improving software technology associated with registering active electronic devices with hardware nodes and associating each valid node with a group of digital tokens for detecting a decision and modifying associated software. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as Read-Only Memory (ROM) device or firmware 85) may include algorithms (e.g., the algorithms of FIGS. 2 and 3) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as ROM device or firmware 85, or may be accessed by processor 91 directly from such a static, nonremovable, read-only medium. Similarly, in some embodiments, stored computer program code 97 may be stored as ROM device or firmware 85, or may be accessed by processor 91 directly from such ROM device or firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with registering active electronic devices with hardware nodes and associating each valid node with a group of digital tokens for detecting a decision and modifying associated software. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with registering active electronic devices with hardware nodes and associating each valid node with a group of digital tokens for detecting a decision and modifying associated software. In another embodiment, the invention provides a business method that performs the process steps of the invention on a subscription, advertising, and/or fee basis. That is, a service supplier, such as a Solution Integrator, could offer to enable a process for improving software technology associated with registering active electronic devices with hardware nodes and associating each valid node with a group of digital tokens for detecting a decision and modifying associated software. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a configuration of hardware and software, any configuration of hardware and software, as would be known to a person of ordinary skill in the art, may be utilized for the purposes stated supra in conjunction with the computer system 90 of FIG. 5. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
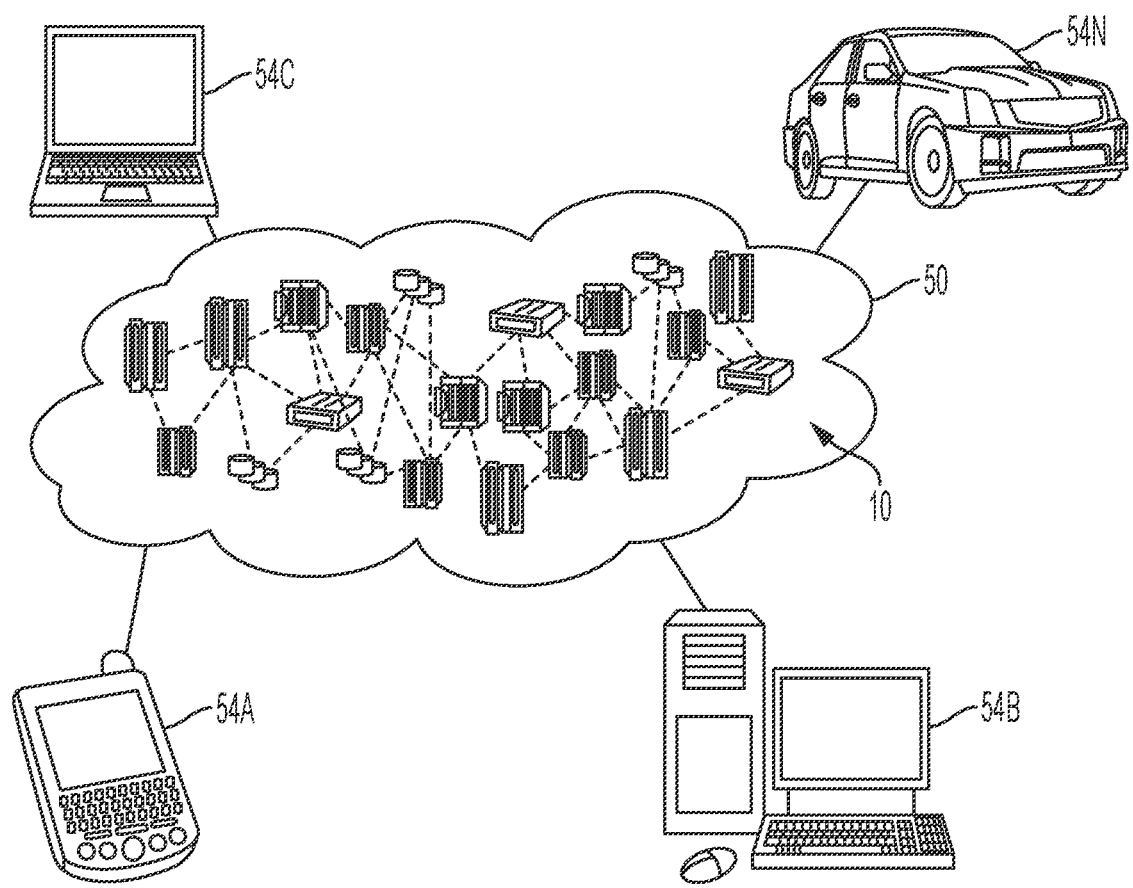
FIG. 6 illustrates a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
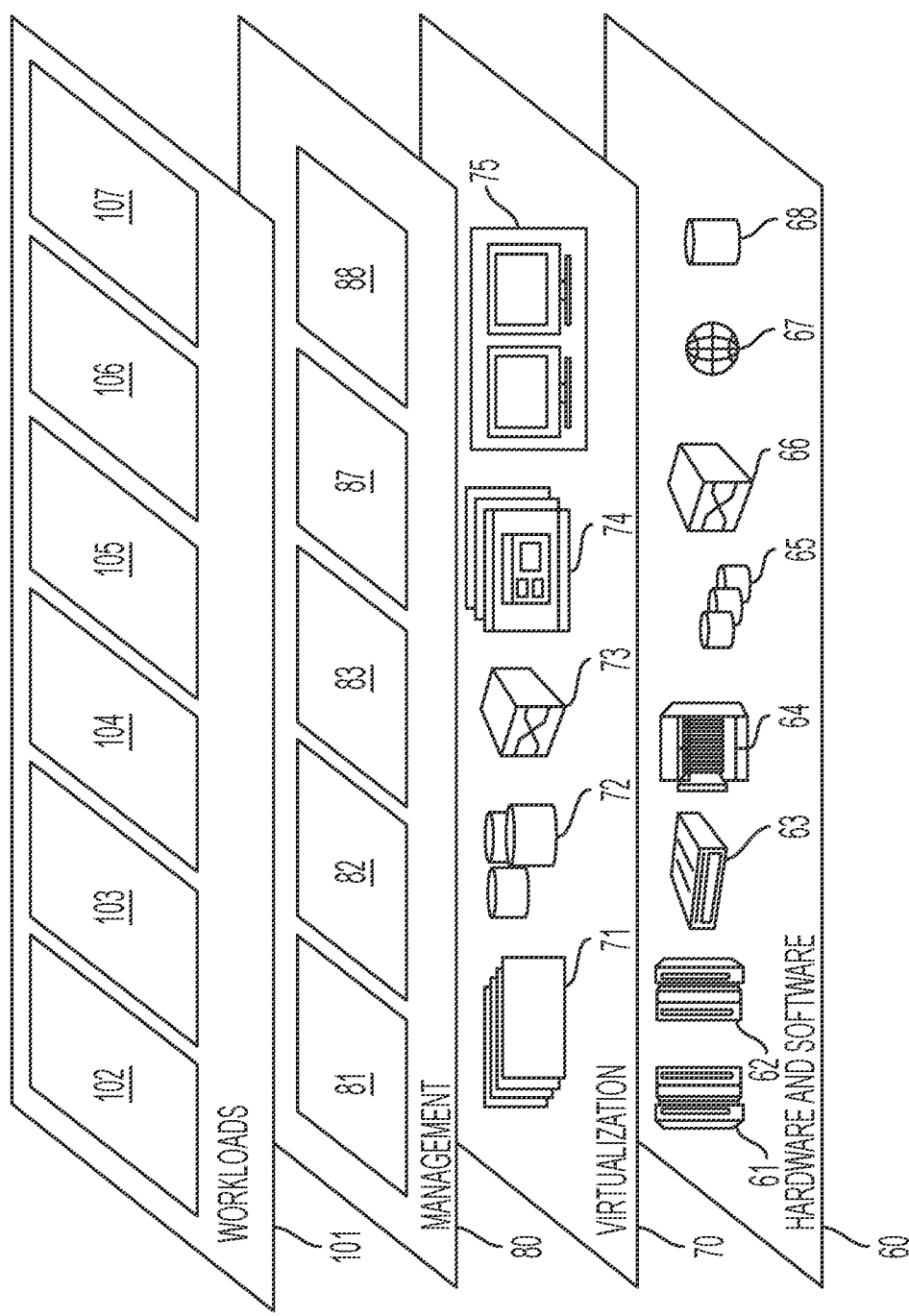
FIG. 7 illustrates a set of functional abstraction layers provided by cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 104; data analytics processing 105; transaction processing 106; and for improving software technology associated with registering active electronic devices with hardware nodes and associating each valid node with a group of digital tokens for detecting a decision and modifying associated software 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A software detection method comprising:
executing, by a processor of an electronic device enabling a blockchain instance, determination software for detecting a decision associated with an individual of a plurality of individuals;
receiving, by the processor from a user, a selection for a specified user type associated with said individual;
transmitting, by said processor to devices of said plurality of individuals, a push notification;
activating, by said processor in response to a response to said transmitting, specified software loaded within active devices of said devices;
registering, by said processor, an active device of said active devices with a valid hardware node within said blockchain instance;
associating, by said processor, said valid hardware node with a group of digital tokens and an associated group of blockchain addresses;
transmitting, by said processor to said valid node via said associated group of blockchain addresses, modified digital tokens of said group of digital tokens, wherein said modified digital tokens comprise embedded digital data associated with said decision;
assigning, by said processor, a weighting value to a modified digital token of said modified digital tokens;
analyzing, by said processor executing neural network software, said modified digital token with respect to an associated weighting value; and
modifying, by said processor based on results of said analyzing, said determination software.

2. The method of claim 1, wherein said specified user type comprises an expertise type, wherein said selection for said specified user type is received randomly, and wherein said assigning said weighting value comprises:
adjusting initial weighting values in accordance with said expertise type.

3. The method of claim 1, wherein said specified user type comprises an expertise type, wherein said selection for said specified user type is received in accordance with execution of sigma distribution software for randomly selecting a specified number of nodes per a normal weight distribution, and wherein said assigning said weighting value comprises:
adjusting initial weighting values in accordance with said expertise type.

4. The method of claim 1, wherein said specified user type comprises a shareholder type, and wherein said assigning said weighting value comprises:
adjusting initial weighting values in accordance with a proportion of shares owned by said individual of said plurality of individuals vs total of existing shares.

5. The method of claim 1, wherein said associated group of blockchain addresses is associated with three destination node addresses of said associated group of blockchain addresses.

6. The method of claim 1, wherein said analyzing said modified digital token with respect to said associated weighting value comprises:
detecting similarities between input data with respect to digital parameters associated with comment analysis.

7. The method of claim 6, further comprising:
aggregating said similarities with respect to a topic and a domain for a total number of comments of said comment analysis received with respect to said associated group of blockchain addresses.

8. The method of claim 1, further comprising:
providing at least one support service for at least one of creating, integrating, hosting, maintaining, and deploying computer-readable code in the control hardware, said code being executed by the computer processor to implement: said executing, said receiving, said transmitting said push notification, said activating, said registering, said associating, said transmitting said modified digital tokens, said assigning, said analyzing, and said modifying.

9. A computer program product, comprising a computer readable hardware storage device storing a computer readable program code, said computer readable program code comprising an algorithm that when executed by a processor of an electronic device implements a software detection method, said method comprising:
executing, by said processor enabling a blockchain instance, determination software for detecting a decision associated with an individual of a plurality of individuals;
receiving, by the processor from a user, a selection for a specified user type associated with said individual;
transmitting, by said processor to devices of said plurality of individuals, a push notification;
activating, by said processor in response to a response to said transmitting, specified software loaded within active devices of said devices;
registering, by said processor, an active device of said active devices with a valid hardware node within said blockchain instance;
associating, by said processor, said valid hardware node with a group of digital tokens and an associated group of blockchain addresses;
transmitting, by said processor to said valid node via said associated group of blockchain addresses, modified digital tokens of said group of digital tokens, wherein said modified digital tokens comprise embedded digital data associated with said decision;
assigning, by said processor, a weighting value to a modified digital token of said modified digital tokens;
analyzing, by said processor executing neural network software, said modified digital token with respect to an associated weighting value; and
modifying, by said processor based on results of said analyzing, said determination software.

10. The computer program product of claim 9, wherein said specified user type comprises an expertise type, wherein said selection for said specified user type is received randomly, and wherein said assigning said weighting value comprises:
adjusting initial weighting values in accordance with said expertise type.

11. The computer program product of claim 9, wherein said specified user type comprises an expertise type, wherein said selection for said specified user type is received in accordance with execution of sigma distribution software for randomly selecting a specified number of nodes per a normal weight distribution, and wherein said assigning said weighting value comprises:
adjusting initial weighting values in accordance with said expertise type.

12. The computer program product of claim 9, wherein said specified user type comprises a shareholder type, and wherein said assigning said weighting value comprises:
adjusting initial weighting values in accordance with a proportion of shares owned by said individual of said plurality of individuals vs total of existing shares.

13. The computer program product of claim 9, wherein said associated group of blockchain addresses is associated with three destination node addresses of said associated group of blockchain addresses.

14. The computer program product of claim 9, wherein said analyzing said modified digital token with respect to said associated weighting value comprises:
detecting similarities between input data with respect to digital parameters associated with comment analysis.

15. The computer program product of claim 14, wherein said method further comprises:
aggregating said similarities with respect to a topic and a domain for a total number of comments of said comment analysis received with respect to said associated group of blockchain addresses.

16. An electronic device comprising a processor coupled to a computer-readable memory unit, said memory unit comprising instructions that when executed by the processor implements a software detection method comprising:
executing, by said processor enabling a blockchain instance, determination software for detecting a decision associated with an individual of a plurality of individuals;
receiving, by the processor from a user, a selection for a specified user type associated with said individual;
transmitting, by said processor to devices of said plurality of individuals, a push notification;
activating, by said processor in response to a response to said transmitting, specified software loaded within active devices of said devices;
registering, by said processor, an active device of said active devices with a valid hardware node within said blockchain instance;
associating, by said processor, said valid hardware node with a group of digital tokens and an associated group of blockchain addresses;
transmitting, by said processor to said valid node via said associated group of blockchain addresses, modified digital tokens of said group of digital tokens, wherein said modified digital tokens comprise embedded digital data associated with said decision;
assigning, by said processor, a weighting value to a modified digital token of said modified digital tokens;
analyzing, by said processor executing neural network software, said modified digital token with respect to an associated weighting value; and
modifying, by said processor based on results of said analyzing, said determination software.

17. The electronic device of claim 16, wherein said specified user type comprises an expertise type, wherein said selection for said specified user type is received randomly, and wherein said assigning said weighting value comprises:
adjusting initial weighting values in accordance with said expertise type.

18. The electronic device of claim 16, wherein said specified user type comprises an expertise type, wherein said selection for said specified user type is received in accordance with execution of sigma distribution software for randomly selecting a specified number of nodes per a normal weight distribution, and wherein said assigning said weighting value comprises:
adjusting initial weighting values in accordance with said expertise type.

19. The electronic device of claim 16, wherein said specified user type comprises a shareholder type, and wherein said assigning said weighting value comprises:

adjusting initial weighting values in accordance with a proportion of shares owned by said individual of said plurality of individuals vs total of existing shares.

20. The electronic device of claim 16, wherein said associated group of blockchain addresses is associated with three destination node addresses of said associated group of blockchain addresses.

* * * * *